United States Patent [19]

Cox et al.

[11] 4,235,640
[45] Nov. 25, 1980

[54] LIGHTWEIGHT CONCRETE AGGREGATE AND METHOD

[75] Inventors: Bruce P. Cox, Sunland, Calif.; David P. DeVries, 4861 Ocean View, LaCanada, Calif. 91011

[73] Assignee: David P. DeVries, LaCanada, Calif.

[21] Appl. No.: 47,880

[22] Filed: Jun. 12, 1979

[51] Int. Cl.$^3$ .............................................. C04B 31/42
[52] U.S. Cl. ................................ 106/308 Q; 106/96; 106/97; 106/283; 428/403; 428/404; 428/540
[58] Field of Search ............... 106/96, 97, 308 Q, 283; 428/403, 404, 540

[56] References Cited

U.S. PATENT DOCUMENTS

| 2,861,004 | 11/1958 | Sucetti | 106/96 |
| 3,010,840 | 11/1961 | Goff et al. | 106/97 |
| 3,423,222 | 1/1969 | McConnauchy | 106/96 |
| 3,713,856 | 1/1973 | McConnaughy | 106/96 |

*Primary Examiner*—James Poer
*Attorney, Agent, or Firm*—Gordon L. Peterson

[57] ABSTRACT

A lightweight aggregate for use in making concrete which comprises scoria aggregate with the individual particles of the aggregate being impregnated with a slow or medium setting asphalt emulsion in an amount sufficient to materially reduce the absorption rate of the scoria aggregate.

9 Claims, 1 Drawing Figure

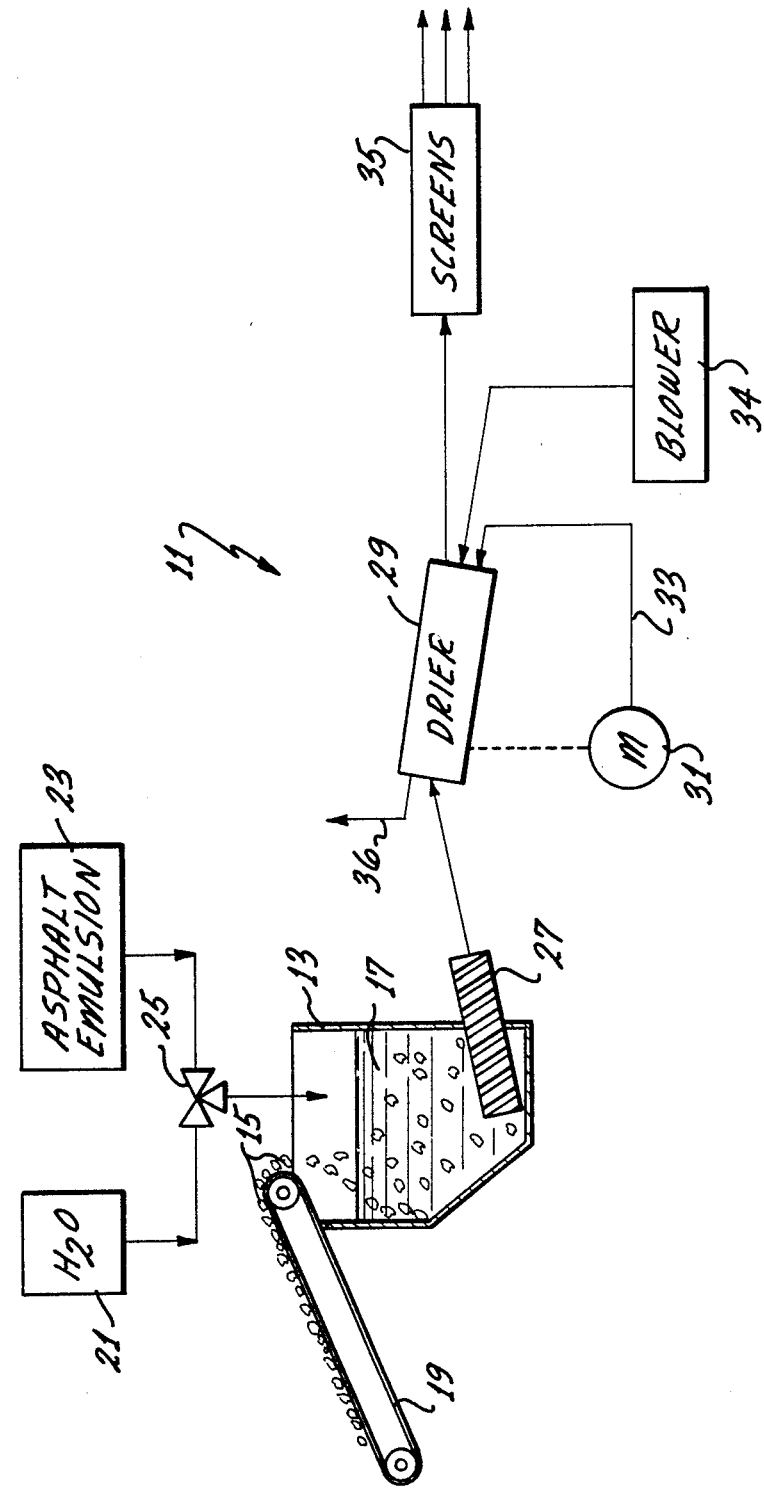

LIGHTWEIGHT CONCRETE AGGREGATE AND METHOD

BACKGROUND OF THE INVENTION

The aggregate used in concrete makes up a material portion of the weight of the concrete. To reduce the weight of the concrete, various porous or expanded aggregate, such as expanded clay and shale, have been used. For example, concrete made with lightweight aggregate may weigh about 100 pounds per cubic foot, whereas regular concrete blended in the same way as lightweight concrete may weigh about 140 pounds per cubic foot. Volcanic cinders, which are commonly referred to as scoria, are highly porous and have also been used. Lightweight concrete has numerous potential advantages, including the reduction in the weight of the concrete structure, reduced energy cost in pumping the concrete and strength-to-weight advantages.

Unfortunately, lightweight concrete has not achieved all of its potential advantages due primarily to the absorption of water and cement in copious amounts by the porous aggregate. The absorption rate of the porous aggregate is, of course, significantly increased when the concrete is pumped due to the high hydrostatic pressure of the pumping system. The absorption of cement is costly and wasteful and makes pumping of the concrete difficult or impossible. Thus, the porosity of the aggregate which is the source of the potential advantages is also the source of the primary problem which has prevented the attainment of these advantages. Moreover, shale is expanded in a process which consumes vast amounts of energy, mainly in the form of natural gas.

Scoria is porous in its natural state and does not require energy expenditures for its porosity. However, it is subject to the water-cement absorption problem noted above. As alluded to in U.S. Pat. No. 4,095,995 issued to Ullrich, it is known to prevent the escape of water into porous aggregate by sealing the particles of the aggregate with a thermoplastic coating or by using highly water repellent sprays, such as silicone resin solutions. However, this deteriorates the bond between the aggregate and the cement which is required for adequate strength of the concrete. It is essential that any method for reducing absorption must not materially adversely affect the ultimate strength of the concrete.

SUMMARY OF THE INVENTION

This invention overcomes the problems noted above by making scoria aggregate suitable for use in concrete. The concrete may be used, for example, to make concrete blocks or it can be poured or pumped into molds of various shapes. With this invention, the absorption rate of the individual particles of the aggregate is reduced materially and pumping of the resulting lightweight concrete is possible. These advantages are obtained while maintaining the strength of the concrete made from the aggregate satisfactory.

These advantages can be obtained by impregnating the individual particles of the scoria with an asphalt emulsion. The asphalt emulsion coats the internal and external surfaces of each aggregate particle. The asphalt emulsion makes each aggregate particle appear to be water-repelling in nature and, unlike the silicone sprays of the prior art, it does so without preventing concrete of adequate strength from being made from the impregnated aggregate. Although the asphalt emulsion to some degree tends to fill some of the voids of each aggregate particle, it primarily serves as a water-repelling agent to reduce the absorption by the aggregate.

The asphalt emulsion should be of the type suitable for mixing with aggregates. As such, medium and slow-setting emulsified asphalts should be used. To obtain a more thorough coating and impregnation, the asphalt emulsion is preferably of low viscosity. In this regard, medium and slow setting emulsified asphalts are also desirable because they are suitable for dilution with water to further reduce the viscosity and improve the impregnation.

The amount or degree of impregnation or coating on each scoria aggregate particle should be sufficient to materially reduce that particle's water absorption. The amount by weight of the asphalt emulsion on a given scoria aggregate particle will depend, for example, on the viscosity of the asphalt emulsion at that time of its application and the geometry of the pores and surfaces of the particle. This can be controlled, for example, in mixing by using a given quantity of the emulsion for a given weight of aggregate. The use of a low-vicosity emulsified asphalt further diluted with water is preferred.

The scoria aggregate can be impregnated in a continuous or batch process and air dried. Neither the impregnation nor the drying requires the application of heat, although heat can be used to assist in drying the impregnated scoria, if desired.

BRIEF DESCRIPTION OF THE DRAWING

The drawing illustrates schematically a preferred manner of impregnating scoria with asphalt emulsion.

DESCRIPTION OF THE PREFERRED EMBODIMENT

The drawing shows a scoria impregnation apparatus 11 which comprises a hopper 13 for receiving scoria aggregate 15 and for containing a bath 17 of asphalt emulsion. The scoria aggregate 15 can be loaded into the hopper 13 in various ways, such as by an endless conveyor 19 which deposits the aggregate into the hopper 13 from the upper end of the hopper. The aggregate 15 provided by the conveyor 19 is of the appropriate size and may be, for example, from 1/16 inch to 11/16 inch across its maximum dimension. Scoria aggregate of the appropriate size can be provided in any of a variety of known ways, such as by screens (not shown).

Water and asphalt emulsion are stored in separate storage tanks 21 and 23, respectively. The water and the asphalt emulsion from the storage tanks 21 and 23 are mixed in any desired ratio by an adjustable mixing valve 25 to appropriately reduce the viscosity of the asphalt emulsion. The low-viscosity asphalt emulsion is then supplied to the hopper 13.

Within the hopper 13, the aggregate 15 is immersed in the asphalt emulsion bath 17. The impregnation of the asphalt emulsion in the scoria can be carried out at ambient temperature and with or without agitation of the bath. An immersion time of only thirty to sixty seconds is necessary to impregnate the scoria with the asphalt emulsion. Thus, as the scoria aggregate 15 descends through the bath of asphalt emulsion 17 toward the bottom of the hopper 13, the mixing and impregnation take place.

The impregnated scoria aggregate 15 can be removed from the hopper 13 in various different ways, such as by an auger 27 which augers the material from the bottom of the hopper 13 to a drier 29. Also, the auger 27 agitates the bath 17 and the aggregate 15 to continue the impregnation process. Although various different drying techniques can be used, the drier 29 is an inclined rotating drying tube having interior baffles. The drier 29 is rotated about its longitudinal exis by an engine 31 with the engine exhaust being directed into the drier 29 via a conduit 33 to hasten the drying operation. Air for scoria-drying purposes from a blower 34 is blown through the drier 29 from the downstream end of the drier and exhausted at a vent 36 at the upstream end of the drier. The exhaust from the engine 31 elevates the temperature with the drier to, for example 80° to 85° F. The auger 27 is inclined and constructed so that the liquid asphalt emulsion is not carried into the drier 29. The drier 29 is inclined toward its discharge end to provide gravity movement of the impregnated scoria. If desired, the impregnated scoria aggregate can be dried by the sun and ambient air.

The dried scoria aggregate is fed from the drier 29 to a set of screens 35 which separate the aggregate as a function of size of the individual aggregate particles. For example, the screens 35 may separate the scoria aggregate into three piles containing aggregate from ⅜ inch to 11/16 inch, ¼ inch to ⅜ inch and 1/16 inch to ¼ inch, respectively. The scoria aggregate is then ready for use in making concrete. The conveyor 19 and the auger 27 can be operated continuously or intermittently.

EXAMPLE I

A slow-setting, low-viscosity asphalt emulsion (SS-1h) obtained from the Newhall Refining Co., Inc., of Newhall, Calif., as its Product No. 190 was diluted on a volume basis with ten parts of water for each part of SS-1h. Scoria aggregate ranging in size from ⅜ inch to 11/16 was immersed in a bath of the diluted asphalt emulsion at ambient temperature and allowed to remain in the bath for about one minute to thoroughly impregnate the aggregate with the asphalt emulsion. The impregnated aggregate was then removed from the bath and allowed to air dry.

A water absorption test on 5/16 inch scoria treated in accordance with Example I was conducted in accordance with ASTM Standard C-127 and showed an absorption rate of 5.2 percent in 24 hours and 8.1 percent in 14 days as compared with an absorption rate of 20.2 percent in 24 hours and 27.3 percent in 14 days for 5/16 inch expanded shale and 18.6 percent in 24 hours for 5/16 inch×¼ inch untreated scoria. These absorption tests measure the increase in weight of the aggregate due to water absorption after being exposed to water for the periods indicated, and thus the results are readily compared.

EXAMPLE II

Aggregate impregnated in accordance with Example I was utilized in making a five-sack mix of concrete by mixing 470 pounds of portland cement with 325 pounds of water, 1,220 pounds of washed concrete sand, 345 pounds of 11/16×⅜ inch scoria and 747 pounds of ⅜×3/16 inch scoria. Commonly used concrete additives were mixed with the concrete as follows: 3 fluid ounces of Pozzolith 300 N per 100 pounds of cement and 0.5 fluid ounces of MBAE Admixture per 100 pounds of cement. Both of these additives are available from Master Builders, Los Angeles, Calif. The Pozzolith is a standard additive that permits less water to be used in the concrete while obtaining the same finishing qualities as though more water were used, and the MBAE Admixture is a standard air entrainer which improves the finishing characteristics of the concrete.

The resulting concrete mixture was cast into a number of concrete cylinders which displayed compressive strengths and unit weights in accordance with the following table:

TABLE

| AGE/ DAYS | | COMPRESSIVE STRENGTH, p.s.i. | UNIT WEIGHT AS TESTED, LBS./CU.FT. |
|---|---|---|---|
| 1 | | 585 | 112.2 |
| 1 | | 550 | 112.1 |
| | Average | 568 | 112.2 |
| 3 | | 1185 | 110.1 |
| 3 | | 1130 | 110.1 |
| 3 | | 1130 | 110.6 |
| | Average | 1148 | 110.3 |
| 7 | | 1505 | 110.2 |
| 7 | | 1505 | 111.0 |
| 7 | | 1540 | 110.9 |
| | Average | 1517 | 110.7 |
| 14 | | 1965 | 110.8 |
| 14 | | 1945 | 110.1 |
| | Average | 1955 | 110.5 |
| 28 | | 2775 | 112.8 |
| 28 | | 2725 | 111.4 |
| 28 | | 2705 | 111.1 |
| | Average | 2735 | 111.5 |
| 28 | | | 99.9* |
| 28 | | | 100.7* |
| 28 | | | 100.9* |
| | | AVERAGE | 100.5* |

*oven dry weight

The Table shows an average 28-day compressive strength of 2735 p.s.i. and an average unit weight after 28 days of 100.5 pounds per cubic foot. The compression test results and the unit weights obtained are comparable to what would be expected from a similar concrete mix utilizing manufactured lightweight coarse aggregate. Accordingly, the coating of the scoria aggregate does not reduce the strength of the concrete, although a nearly 400 percent reduction in absorption is obtained as compared with expanded shale and an approximately 357 percent reduction in absorption is obtained as compared with untreated scoria as shown by Example I.

Although an exemplary embodiment of the invention has been shown and described, many changes, modifications and substitutions may be made by one having ordinary skill in the art without necessarily departing from the spirit and scope of this invention.

I claim:

1. A method of treating scoria aggregate to reduce its absorption rate to make the scoria aggregate more suited as an aggregate for lightweight concrete, said method comprising:

providing a slow or medium-setting asphalt emulsion;

diluting the slow or medium-setting asphalt emulsion with water to provide a dilute asphalt emulsion;

mixing aggregate consisting essentially of scoria aggregate with the dilute asphalt emulsion to impregnate the individual particles of the scoria aggregate with the dilute asphalt emulsion; and drying the scoria aggregate.

2. A method as defined in claim 1 wherein said step of mixing is carried out essentially at ambient temperature.

3. A method as defined in claim 1 wherein said step of mixing includes immersing the scoria aggregate in a bath of the asphalt emulsion.

4. A method as defined in claim 1 including providing a hopper containing a bath of the asphalt dilute emulsion, said step of mixing includes substantially continuously depositing the scoria aggregate in said bath to immerse the scoria aggregate in the asphalt emulsion, and to impregnate the scoria aggregate with the asphalt emulsion, and augering the impregnated scoria aggregate from the hopper.

5. A method as defined in claim 1 wherein said step of providing includes providing low-viscosity asphalt emulsion and said step of diluting includes adding water to the low-viscosity asphalt emulsion.

6. A method as defined in claim 1 wherein said step of providing includes providing a slow-setting, low-viscosity asphalt emulsion and said step of diluting includes adding at least about ten parts of water to the asphalt emulsion for each part of the asphalt emulsion on a volume basis.

7. A method as defined in claim 4 wherein said step of drying includes passing the impregnated scoria aggregate through an inclined rotating drying tube.

8. A method as defined in claim 4 wherein said step of augering includes providing an auger with at least a portion of the auger being within the hopper and in the dilute asphalt emulsion and rotating the auger to agitate the bath of the asphalt emulsion to assist the impregnation of the scoria aggregate with the asphalt emulsion.

9. A method as defined in claim 7 wherein said step of providing includes providing a slow-setting, low-viscosity asphalt emulsion and said step of diluting includes adding about ten parts of water to the asphalt emulsion for each part of the asphalt emulsion on a volume basis.

* * * * *